US008909086B2

(12) United States Patent
Kohda

(10) Patent No.: US 8,909,086 B2
(45) Date of Patent: Dec. 9, 2014

(54) IMAGE FORMING APPARATUS, IMAGE FORMING METHOD, AND STORAGE MEDIUM

(75) Inventor: Isao Kohda, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 69 days.

(21) Appl. No.: 13/536,014

(22) Filed: Jun. 28, 2012

(65) Prior Publication Data

US 2013/0004195 A1 Jan. 3, 2013

(30) Foreign Application Priority Data

Jun. 30, 2011 (JP) ................................ 2011-145529

(51) Int. Cl.
*G03G 15/00* (2006.01)
*H04N 1/00* (2006.01)
*G06F 3/12* (2006.01)
*H04N 1/44* (2006.01)

(52) U.S. Cl.
CPC .......... *G06F 3/1222* (2013.01); *H04N 1/00482* (2013.01); *H04N 1/00477* (2013.01); *G06F 3/1285* (2013.01); *H04N 1/00633* (2013.01); *H04N 1/4413* (2013.01); *G06F 3/1267* (2013.01); *G06F 3/1259* (2013.01); *G03G 15/5016* (2013.01); *H04N 1/00408* (2013.01); *H04N 2201/0094* (2013.01); *G03G 15/50* (2013.01); *G03G 15/6538* (2013.01)
USPC ........................................................ 399/82

(58) Field of Classification Search
CPC ............................... G03G 15/00; G03G 15/50
USPC ...................... 399/82; 271/298; 700/223, 224
See application file for complete search history.

(56) References Cited

U.S. PATENT DOCUMENTS 5,435,544 A * 7/1995 Mandel ......................... 271/298
5,602,973 A * 2/1997 Nishiwaki .................... 358/1.14

(Continued)

FOREIGN PATENT DOCUMENTS

JP H07-187491 A 7/1995
JP 1998-236713 * 8/1998 ............. G03G 15/00

(Continued)

OTHER PUBLICATIONS

Notice of Reasons for Rejection issued to JP Application No. 2011-145529 mailed Sep. 11, 2013.

(Continued)

*Primary Examiner* — Clayton E Laballe
*Assistant Examiner* — Kevin Butler
(74) *Attorney, Agent, or Firm* — Knobbe Martens Olson & Bear LLP

(57) ABSTRACT

An image forming apparatus includes an image forming unit, a plurality of discharge units, a storage unit, a searching unit, a display unit, a designating unit, and a setting unit. In a case where a request for executing a predetermined print job is accepted, with respect to each of the plurality of discharge units, the searching unit searches for print job information designating each of the plurality of discharge units as a discharge destination of a printed material on the basis of designation information included in the print job information stored in the storage unit. With respect to each of the plurality of discharge units, the display unit displays information on whether there is print job information designating each of the plurality of discharge units as a discharge destination of a printed material.

9 Claims, 8 Drawing Sheets

10 P 14 15 12 13 X 16 21 17 18 19 20 11 a b 34 c d e 23 26 25 27 24 Y C K M 35 28 22 31 33 29a 29b 30 29c 32

(56) References Cited

U.S. PATENT DOCUMENTS

| | | | | |
|---|---|---|---|---|
| 5,752,697 | A * | 5/1998 | Mandel et al. | 271/288 |
| 5,815,764 | A * | 9/1998 | Tomory | 399/1 |
| 5,823,529 | A * | 10/1998 | Mandel et al. | 271/296 |
| 5,867,393 | A * | 2/1999 | Richardson et al. | 700/223 |
| 5,913,093 | A * | 6/1999 | Yamanaka et al. | 399/82 |
| 5,970,218 | A * | 10/1999 | Mullin et al. | 358/1.15 |
| 6,192,295 | B1 * | 2/2001 | Gunther | 700/225 |
| 6,206,360 | B1 * | 3/2001 | Urata et al. | 271/9.06 |
| 6,324,442 | B2 * | 11/2001 | Gunther | 700/224 |
| 6,325,368 | B1 * | 12/2001 | Ikeda et al. | 271/3.03 |
| 6,349,243 | B1 * | 2/2002 | Takagi | 700/223 |
| 6,546,313 | B2 * | 4/2003 | Nakahira et al. | 700/224 |
| 6,671,472 | B2 * | 12/2003 | Shimizu et al. | 399/82 |
| 6,912,061 | B1 * | 6/2005 | Ozaki | 358/1.15 |
| 6,988,728 | B2 * | 1/2006 | Kida | 271/292 |
| 7,742,182 | B2 * | 6/2010 | Simpson et al. | 358/1.15 |
| 7,907,296 | B2 * | 3/2011 | Endo et al. | 358/1.15 |
| 8,208,161 | B2 * | 6/2012 | LeVier et al. | 358/1.15 |
| 8,565,635 | B2 * | 10/2013 | Yamada | 399/85 |
| 2001/0054793 | A1 * | 12/2001 | Nakahira et al. | 271/298 |
| 2002/0031364 | A1 * | 3/2002 | Suzuki et al. | 399/75 |
| 2002/0131787 | A1 * | 9/2002 | Shimizu et al. | 399/82 |
| 2006/0062588 | A1 * | 3/2006 | Saka et al. | 399/80 |
| 2006/0263110 | A1 * | 11/2006 | Sahay | 399/82 |
| 2010/0290088 | A1 | 11/2010 | Ito | |
| 2012/0045242 | A1 * | 2/2012 | Yamada | 399/85 |
| 2013/0004195 | A1 * | 1/2013 | Kohda | 399/82 |

FOREIGN PATENT DOCUMENTS

| | | | | |
|---|---|---|---|---|
| JP | 10-236713 | A | 9/1998 | |
| JP | 1998-236713 | * | 9/1998 | G03G 21/00 |
| JP | 2000132356 | A | 5/2000 | |
| JP | 2005190093 | A | 7/2005 | |
| JP | 2006001241 | A | 1/2006 | |
| JP | 2010-264635 | A | 11/2010 | |

OTHER PUBLICATIONS

Machine Translation of JPH07-187491.
Machine Translation of JP2005-190093.
Machine Translation of JP2006-001241.
Machine Translation of JP2000-132356.
Notice of Reasons for Rejection issued to JP Application No. 2011-145529, mailed Jun. 18, 2014.

* cited by examiner

10
PC
53
MFP
54
52
42
41
INPUT/DISPLAY UNIT
DISPLAY CONTROL UNIT
PRINT-JOB RECEIVING UNIT
46
NETWORK INTERFACE
51
43
USER AUTHENTICATING UNIT
SEARCHING/ DETERMINING UNIT
FIRST STORAGE UNIT
SECOND STORAGE UNIT
PRINT CONTROL UNIT
IMAGE FORMING UNIT
SORTING/ DISCHARGING UNIT
47
44
45
48
49
50

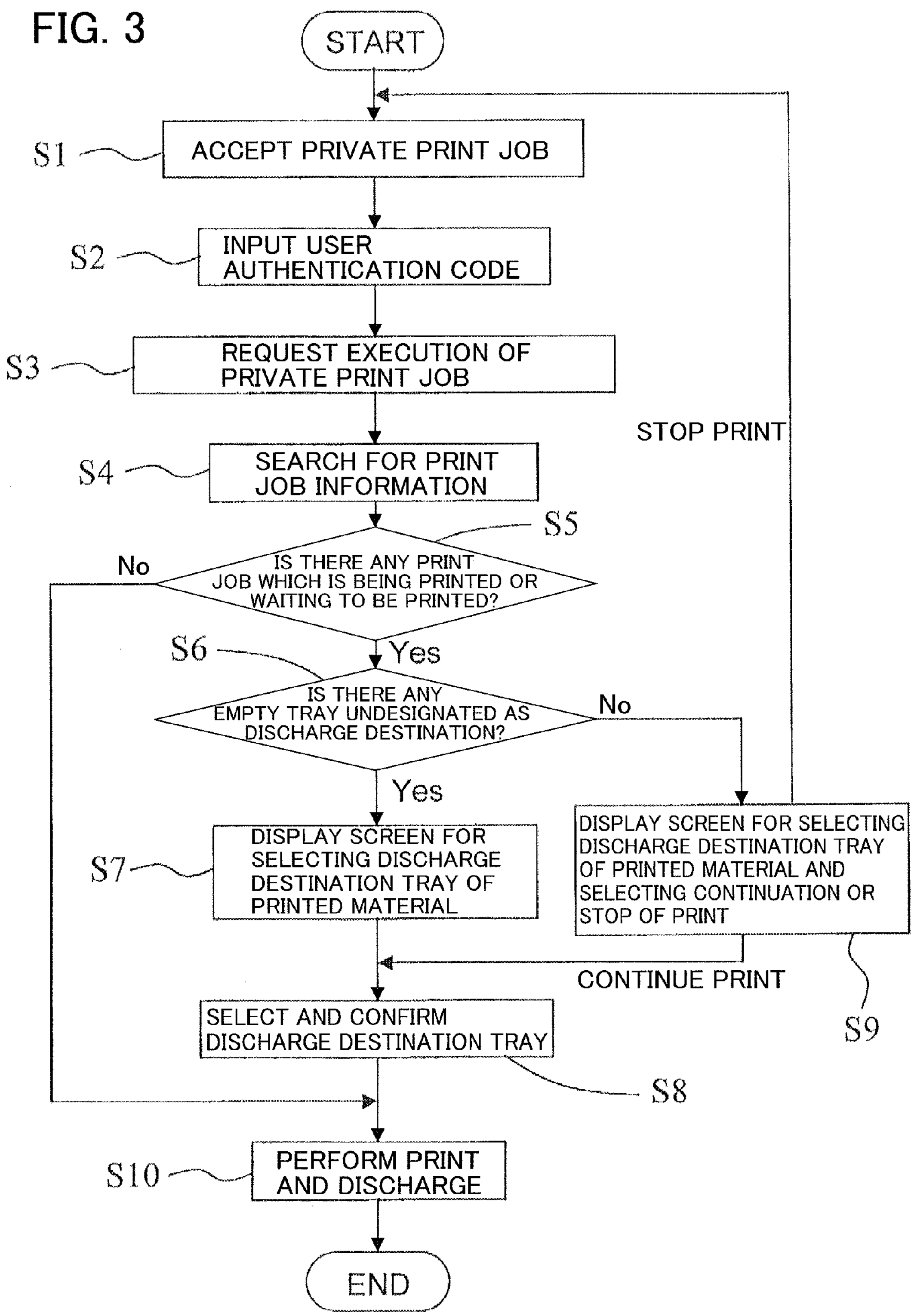
FIG. 3
START
S1
ACCEPT PRIVATE PRINT JOB
S2
INPUT USER AUTHENTICATION CODE
S3
REQUEST EXECUTION OF PRIVATE PRINT JOB
STOP PRINT
S4
SEARCH FOR PRINT JOB INFORMATION
S5
IS THERE ANY PRINT JOB WHICH IS BEING PRINTED OR WAITING TO BE PRINTED?
No
Yes
S6
IS THERE ANY EMPTY TRAY UNDESIGNATED AS DISCHARGE DESTINATION?
No
Yes
S7
DISPLAY SCREEN FOR SELECTING DISCHARGE DESTINATION TRAY OF PRINTED MATERIAL
DISPLAY SCREEN FOR SELECTING DISCHARGE DESTINATION TRAY OF PRINTED MATERIAL AND SELECTING CONTINUATION OR STOP OF PRINT
CONTINUE PRINT
S9
SELECT AND CONFIRM DISCHARGE DESTINATION TRAY
S8
S10
PERFORM PRINT AND DISCHARGE
END

FIG. 4

| DESIGNATED TRAY | STATE | DOCUMENT NAME | USER | TERMINAL | FILE SIZE | RECEPTION TIME |
|---|---|---|---|---|---|---|
| a | PRINTING STATE | A | AA | U10 | 251kB | 14:54:32 |
| a | WAITING STATE | B | AB | U01 | 53kB | 14:55:12 |
| a | WAITING STATE | C | AC | U03 | 121kB | 15:00:15 |
| b | WAITING STATE | D | DA | U01 | 70kB | 14:55:30 |
| c | EMPTY | | | | | |
| e | WAITING STATE | E | EA | U09 | 375kB | 15:03:26 |
| X | WAITING STATE | F | FA | U10 | 764kB | 15:01:45 |

FIG. 5

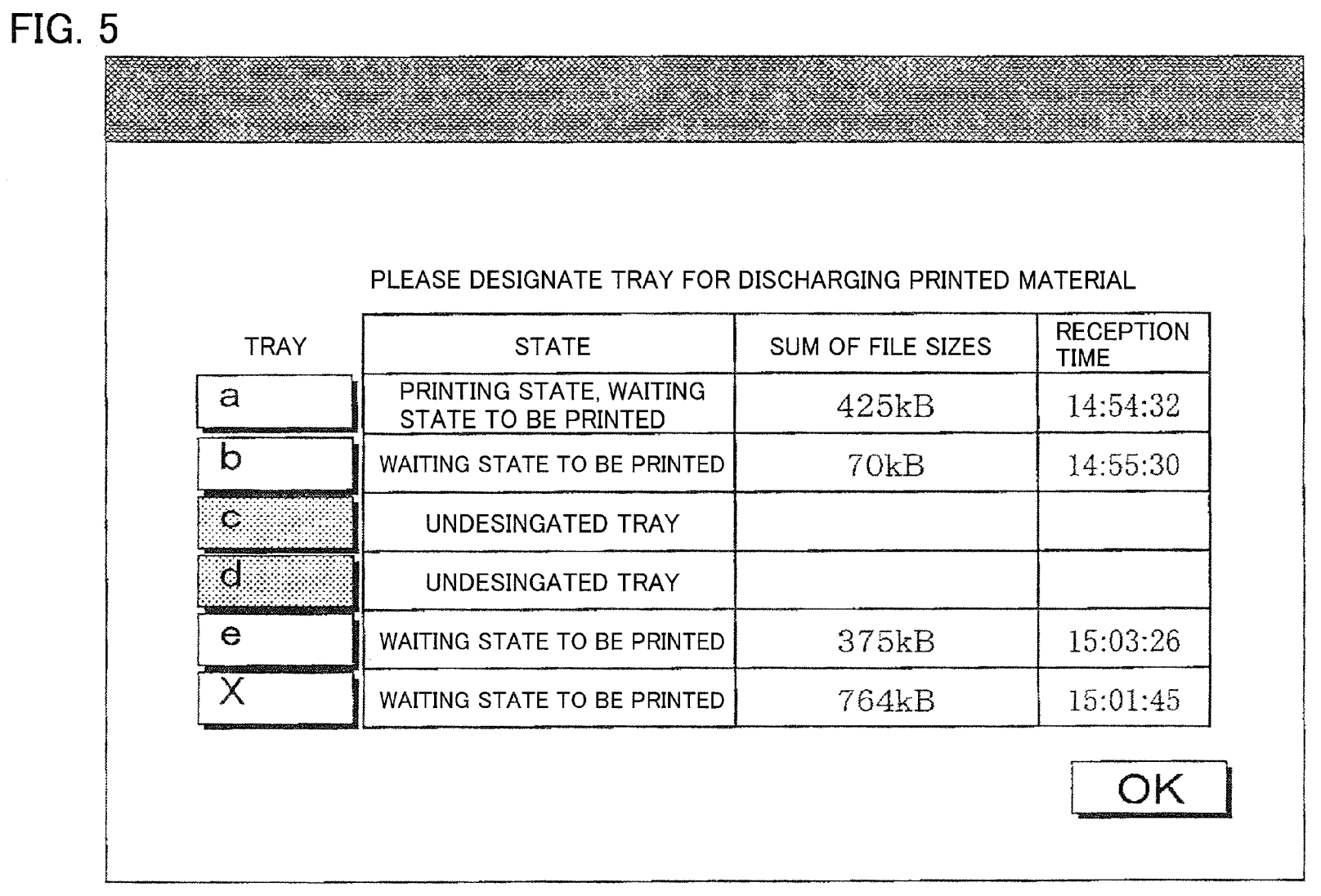

PLEASE DESIGNATE TRAY FOR DISCHARGING PRINTED MATERIAL

| TRAY | STATE | SUM OF FILE SIZES | RECEPTION TIME |
|---|---|---|---|
| a | PRINTING STATE, WAITING STATE TO BE PRINTED | 425kB | 14:54:32 |
| b | WAITING STATE TO BE PRINTED | 70kB | 14:55:30 |
| c | UNDESINGATED TRAY | | |
| d | UNDESINGATED TRAY | | |
| e | WAITING STATE TO BE PRINTED | 375kB | 15:03:26 |
| X | WAITING STATE TO BE PRINTED | 764kB | 15:01:45 |

Figure 6:
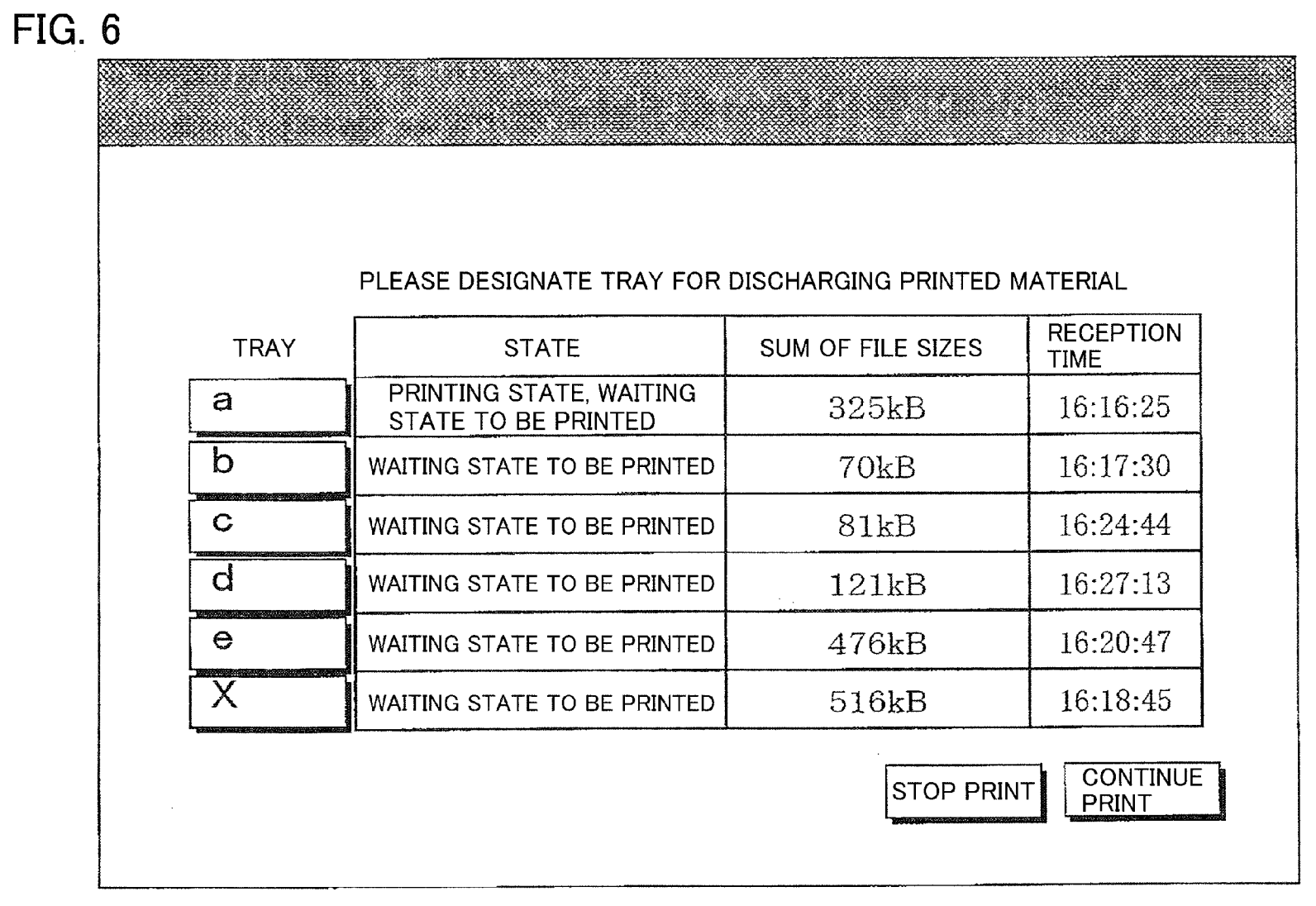

PLEASE DESIGNATE TRAY FOR DISCHARGING PRINTED MATERIAL

| TRAY | STATE | SUM OF FILE SIZES | RECEPTION TIME |
|---|---|---|---|
| a | PRINTING STATE, WAITING STATE TO BE PRINTED | 325kB | 16:16:25 |
| b | WAITING STATE TO BE PRINTED | 70kB | 16:17:30 |
| c | WAITING STATE TO BE PRINTED | 81kB | 16:24:44 |
| d | WAITING STATE TO BE PRINTED | 121kB | 16:27:13 |
| e | WAITING STATE TO BE PRINTED | 476kB | 16:20:47 |
| X | WAITING STATE TO BE PRINTED | 516kB | 16:18:45 |

STOP PRINT

CONTINUE PRINT

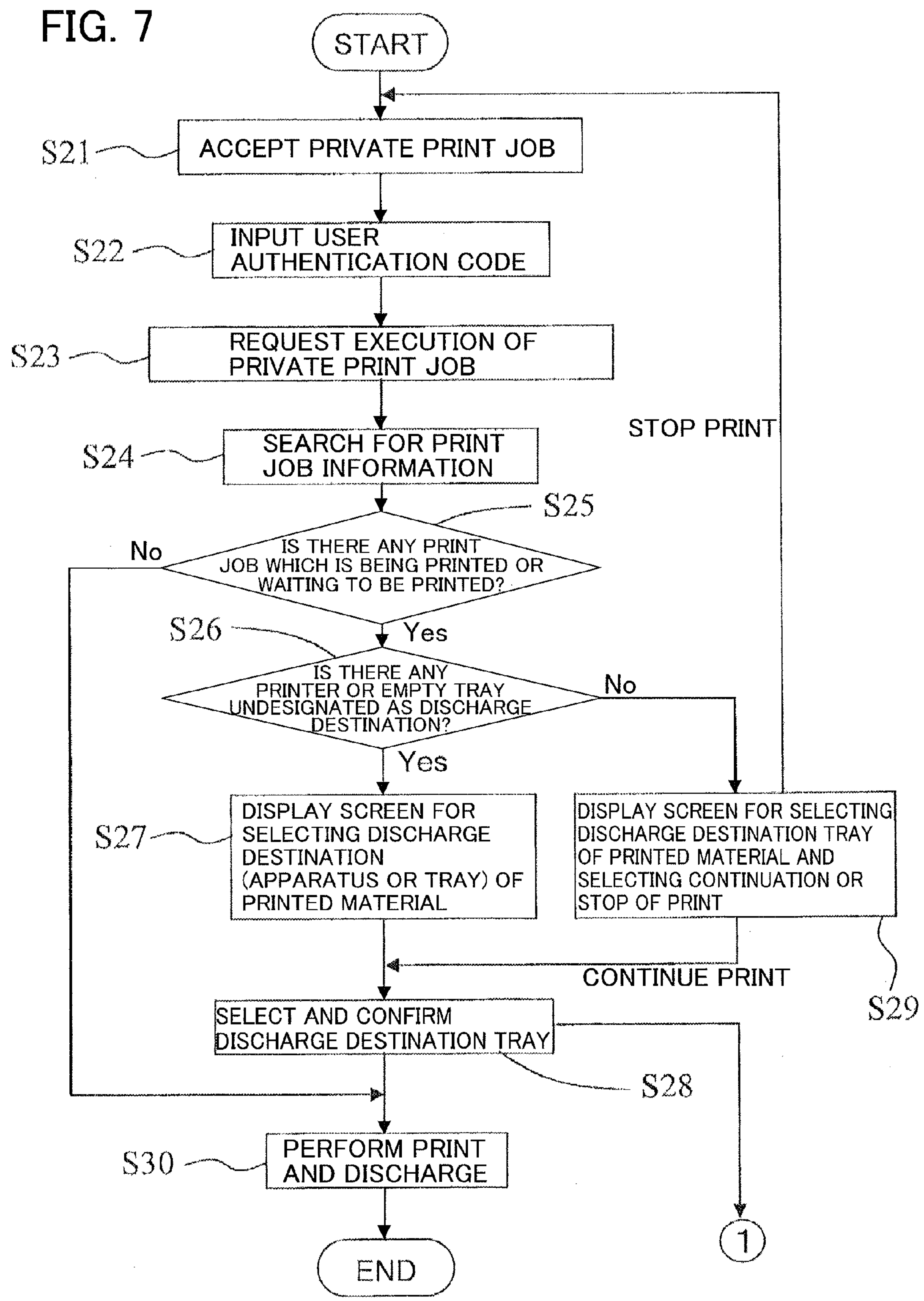
FIG. 7
START
S21
ACCEPT PRIVATE PRINT JOB
S22
INPUT USER AUTHENTICATION CODE
S23
REQUEST EXECUTION OF PRIVATE PRINT JOB
S24
SEARCH FOR PRINT JOB INFORMATION
STOP PRINT
S25
IS THERE ANY PRINT JOB WHICH IS BEING PRINTED OR WAITING TO BE PRINTED?
No
Yes
S26
IS THERE ANY PRINTER OR EMPTY TRAY UNDESIGNATED AS DISCHARGE DESTINATION?
No
Yes
S27
DISPLAY SCREEN FOR SELECTING DISCHARGE DESTINATION (APPARATUS OR TRAY) OF PRINTED MATERIAL
DISPLAY SCREEN FOR SELECTING DISCHARGE DESTINATION TRAY OF PRINTED MATERIAL AND SELECTING CONTINUATION OR STOP OF PRINT
CONTINUE PRINT
S29
SELECT AND CONFIRM DISCHARGE DESTINATION TRAY
S28
S30
PERFORM PRINT AND DISCHARGE
END
1

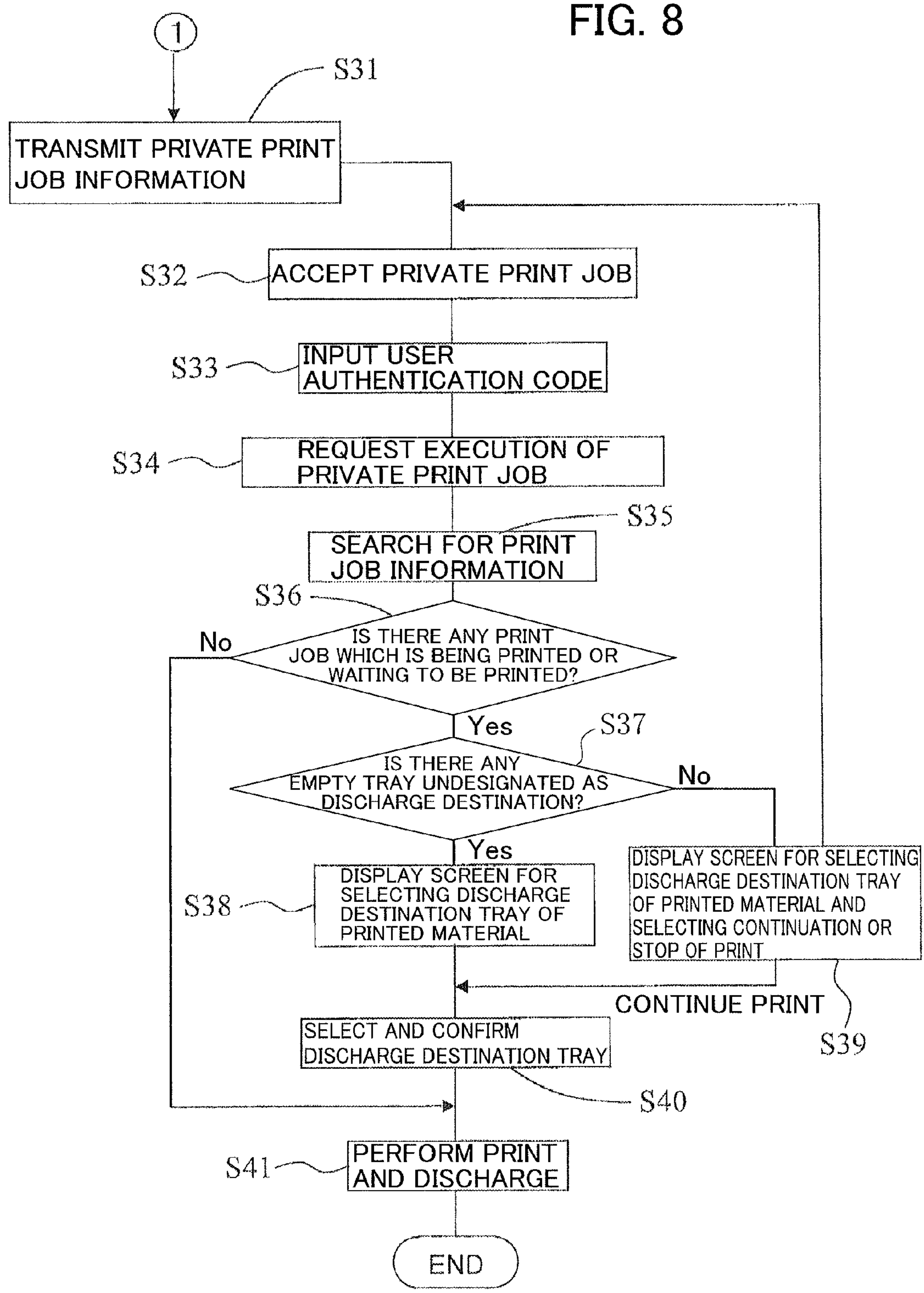
FIG. 8
1
S31
TRANSMIT PRIVATE PRINT JOB INFORMATION
S32
ACCEPT PRIVATE PRINT JOB
S33
INPUT USER AUTHENTICATION CODE
S34
REQUEST EXECUTION OF PRIVATE PRINT JOB
S35
SEARCH FOR PRINT JOB INFORMATION
S36
IS THERE ANY PRINT JOB WHICH IS BEING PRINTED OR WAITING TO BE PRINTED?
No
Yes
S37
IS THERE ANY EMPTY TRAY UNDESIGNATED AS DISCHARGE DESTINATION?
No
Yes
S38
DISPLAY SCREEN FOR SELECTING DISCHARGE DESTINATION TRAY OF PRINTED MATERIAL
DISPLAY SCREEN FOR SELECTING DISCHARGE DESTINATION TRAY OF PRINTED MATERIAL AND SELECTING CONTINUATION OR STOP OF PRINT
CONTINUE PRINT
S39
SELECT AND CONFIRM DISCHARGE DESTINATION TRAY
S40
S41
PERFORM PRINT AND DISCHARGE
END

IMAGE FORMING APPARATUS, IMAGE FORMING METHOD, AND STORAGE MEDIUM

INCORPORATION BY REFERENCE

This application is based on and claims the benefit of priority from Japanese Patent Application No. 2011-145529, filed on 30 Jun. 2011, the content of which is incorporated herein by reference.

BACKGROUND

This disclosure relates to an image forming apparatus, an image forming method, and a storage medium.

There are widely used network systems configured by connecting a user terminal device (hereinafter, referred to as a terminal device) such as a personal computer (PC) to an image forming apparatus such as a printer by a network, such that documents, drawings, images, and the like generated in the terminal device by a user can be printed out by the image forming apparatus.

Recently, there have been used digital multi function peripherals (MFP) in offices. The digital MFPs are devices having not only a print function but also the functions of a copy machine, a facsimile, a printer, and the like.

Currently, some of image forming apparatuses such as MFPs have a so-called private print function. The private print is a function provided to prevent the contents of a printed document output from an image forming apparatus by a user from being seen by other people and to prevent the printed document from being obtained by other people. An example of a procedure for obtaining a printed document from an image forming apparatus having the private print function is as follows.

First, a user in front of the image forming apparatus transmits data of documents, drawings, images, and the like (these data will be hereinafter referred to as print data since print has been assumed) generated in a terminal device, information representing private print, and a user authentication code regarding the private print from the terminal device to the image forming apparatus. The transmitted print data is not immediately printed, but is temporarily stored in the image forming apparatus.

Next, the user inputs the user authentication code and a print request from an input device which is positioned on the front side of the image forming device and is included in the image forming apparatus.

In this way, print is performed in a MFP or the like, and the user can obtain a printed material.

In a case of using the private print function as described above, since the user works in a place where the image forming apparatus is installed, the user can obtain the printed material discharged from the image forming apparatus immediately after the discharge. Therefore, it is possible to avoid failures occurring during usual print using a network. In other words, since printed materials are output from the image forming apparatus disposed in a place away from the terminal device on which the user works, it is possible to eliminate any chances for other people to see or obtain the printed materials. Further, it is possible to prevent the user from forgetting to take user's own printed materials.

As stated above, the private print function is effective for users who desire to preserve confidentiality of printed materials to be output. However, in the following respects, improvements are required.

In other words, in the private print, in a state where the user is close to the image forming apparatus, printed materials are output to a standard discharge destination or a plurality of discharge destinations, such as mailboxes, of the image forming apparatus.

However, even if the user designates a discharge destination for a printed material which needs preservation of confidentiality, frequently, documents and the like which a plurality of other users requests the corresponding image forming apparatus to print through the network are discharged almost simultaneously with discharge of the printed material regarding the private print and successively with taking a little time to the same discharge destination.

In this case, the user may not easily recognize when the printed material regarding the private print was discharged or what is the user's own printed material. In a case where the printed material is mixed with output documents of other users and is produced, the printed material has the risk of being seen or obtained by other people.

With respect to this, related technology 1 discloses an image forming apparatus which distinguishes discharge destinations according to, for example, image data transmitted from a device of an image reading apparatus, a computer, and the like connected to a network line to a printer.

The related technology 1 further discloses a technology for setting an empty tray where there is no remaining discharged sheet, as a sheet discharge destination, thereby avoiding mixture of discharged sheets. However, the technology disclosed in the related technology 1 does not distinguish between printed materials regarding the private print and other printed materials.

SUMMARY

An image forming apparatus includes an image forming unit, a plurality of discharge units, a storage unit, a searching unit, a display unit, a designating unit, and a setting unit.

The image forming unit forms images on image formation medium based on predetermined print job information, thereby generating a printed material.

The plurality of discharge units are discharge destinations of printed materials generated by the image forming unit.

The storage unit stores print job information, which includes print data and designation information designating the discharge destination of the printed material to be generated based on the print data and designating a specific discharge unit of the plurality of discharge units.

The searching unit is configured to be able to accept a request for executing a print job based on the predetermined print job information. In a case where the request for executing the predetermined print job is accepted, with respect to each of the plurality of discharge units, the searching unit searches for the print job information designating each of the plurality of discharge units as the discharge destination of the printed material based on the designation information included in the print job information stored in the storage unit.

With respect to each of the plurality of discharge units, the display unit displays information on whether there is any print job information designating each of the plurality of discharge units as a discharge destination of a printed material based on a search result of the searching unit.

The designating unit can designate a specific discharge unit of the plurality of discharge units as the discharge destination of the printed material generated according to the predetermined print job information.

In a case where the designating unit designates the specific discharge unit of the plurality of discharge units as the discharge destination of the printed material generated according to the predetermined print job information, the setting unit sets the designated discharge unit as the discharge destination of the printed material generated based on the predetermined print job information.

In an image forming method, an image forming apparatus having a plurality of discharge units as discharge destinations of generated printed materials forms images on image formation medium so as to generate a printed material, and discharges the printed material to a predetermined discharge unit.

The image forming method includes an image forming step, a storing step, a searching step, a displaying step, a designating step, and a setting step.

In the image forming step, the image forming apparatus forms images on image formation medium based on predetermined print job information, thereby generating a printed material.

In the storing step, the image forming apparatus stores the print job information, which includes print data and designation information designating the discharge destination of the printed material generated based on the print data and designating a specific discharge unit of the plurality of discharge units.

In a case where a request for executing a print job based on the predetermined print job information is accepted, in the searching step, with respect to each of the plurality of discharge units, the image forming apparatus searches for the print job information designating each of the plurality of discharge units as a discharge destination of a printed material based on the designation information included in the stored print job information.

In the displaying step, with respect to each of the plurality of discharge units, the image forming apparatus displays information on whether there is print job information designating each of the plurality of discharge units as a discharge destination of a printed material based on a search result in the searching step.

In the designating step, the image forming apparatus can designate a specific discharge unit of the plurality of discharge units as the discharge destination of the printed material generated based on the predetermined print job information.

In a case where the specific discharge unit is designated as the discharge destination of the printed material generated based on the predetermined print job information in the designating step, in the setting step, the image forming apparatus sets the designated discharge unit as the discharge destination of the printed material generated based on the predetermined print job information. A storage medium stores the program for executing the image forming method.

The storage medium is computer-readable.

BRIEF DESCRIPTION OF THE DRAWINGS

FIG. 3 is a flow chart illustrating a private-print-job executing method according to a first embodiment of the present disclosure.

FIG. 4 is a view illustrating an example of print job information of an MFP according to the first embodiment of the present disclosure.

FIG. 5 is a view illustrating an example of a screen for selecting a tray as the discharge destination of a printed material.

FIG. 6 is a view illustrating an example of a screen for selecting a tray as the discharge destination of a printed material.

FIG. 7 is a flow chart illustrating a private-print-job executing method according to a second embodiment of the present disclosure.

FIG. 8 is a flow chart illustrating a private-print-job executing method according to the second embodiment of the present disclosure.

DETAILED DESCRIPTION

Hereinafter, an embodiment of an image forming apparatus according to the present disclosure will be described with reference to the drawings. The present embodiment to be described hereinafter is an example obtained by embodying the present disclosure, and is not intended to limit the technical scope of the present disclosure.

(First Embodiment)

Figure 1:
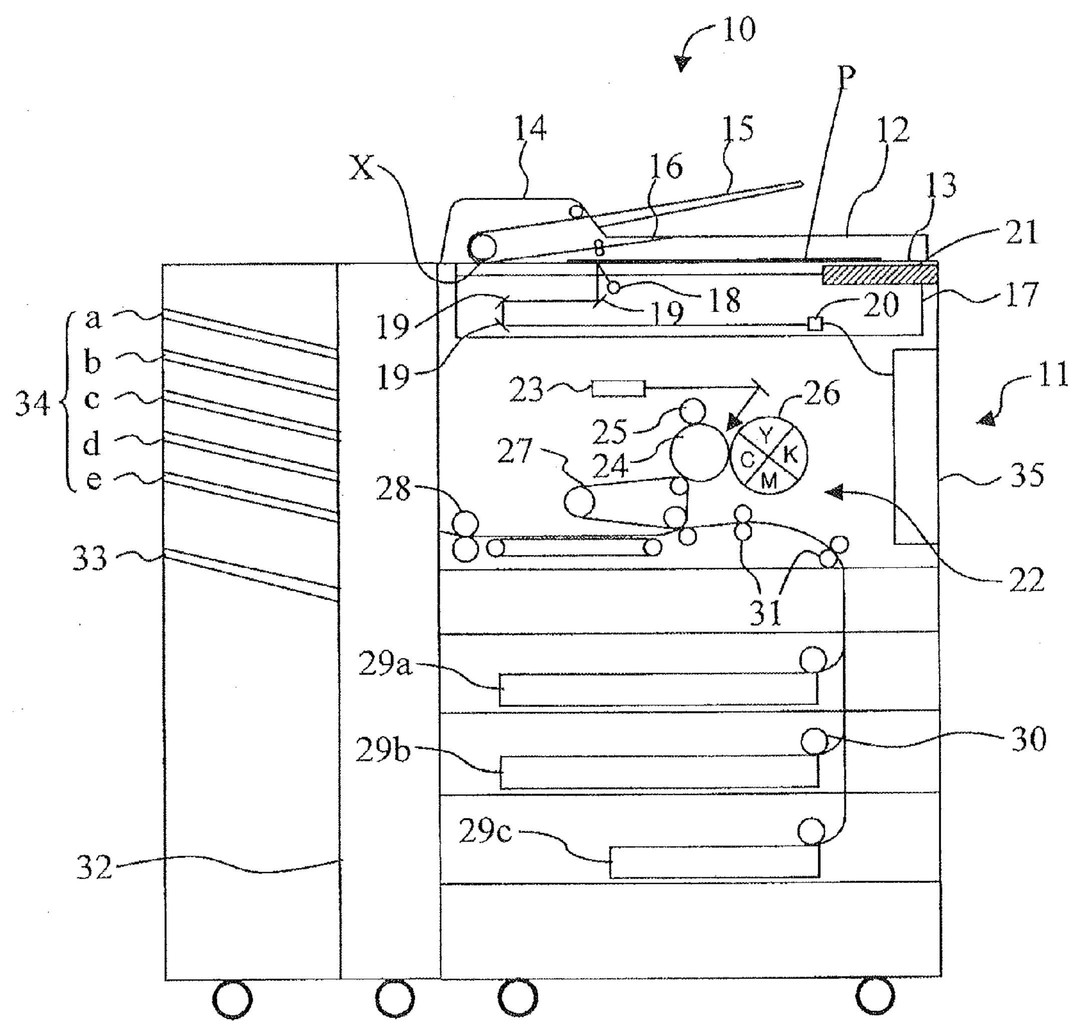
FIG. 1 is a conceptual view illustrating an example of an entire internal configuration of an image forming apparatus according to the present disclosure.

FIG. 1 illustrates a representative example of an image forming apparatus having a private print function according to a first embodiment of the present disclosure. FIG. 1 is a conceptual view particularly illustrating the entire configuration of the inside of the image forming apparatus. In FIG. 1, the details of parts not directly related to the present disclosure are not illustrated. Some of image forming apparatuses have various functions. The apparatus illustrated in FIG. 1 is a digital MFP 10 having functions of a printer, a copy machine, a scanner, a facsimile, and the like.

The MFP 10 which is the digital MFP illustrated in FIG. 1 is configured to be able to operate as a copy machine. The MFP 10 includes an image reading unit for reading images of document images including documents, drawings, and the like.

In a case of printing, for example, a document P using the MFP 10, a user disposes the document P on a light transmissive platen 13 or a mounting table 15 illustrated in FIG. 1. Next, the user inputs a copy condition from an input/display unit 21 disposed in the vicinity of the platen 13, and instructs print. In front of the platen 13 as seen from the user side when the user manipulates the MFP 10, the input/display unit 21 is disposed, for example, horizontally.

The input/display unit 21 is used for the user to input setting conditions with respect to image reading, print such as image forming or instructions on processes, and to confirm the contents of input setting conditions and instructions, and messages displayed in response to the inputs and instructions. Also, the input/display unit 21 can accept input of a user authentication code for executing private print. In order to facilitate acceptance of inputs such as setting conditions and instructions, and display of messages after the inputs, in the present embodiment, the input/display unit 21 includes a touch panel (a manipulation panel), and manipulation keys (for example, numeric keypads, a start key, a clear key, a stop key, a reset key, a power key, and the like) which are located adjacent to the touch panel.

If a print instruction is accepted by the input/display unit 21, in the MFP 10, each unit (a mechanical driving unit) operates such that print is executed.

As illustrated in FIG. 1, the MFP 10 includes a main body 11 of an image forming unit, and a platen cover 12 attached on the main body 11. At the top surface of the main body 11, the above-mentioned platen 13 is provided. The platen 13 is changeable between an open state in which the platen 13 is exposed to the outside by the platen cover 12 and a closed state in which the platen 13 is covered by the platen cover 12.

The platen cover 12 includes an automatic document feeder 14, the mounting table 15, and a discharged-sheet table 16.

In a case where a document is mounted on the mounting table 15, not on the platen 13, for copying the document, the automatic document feeder 14 draws the document into a conveyance path, sheet by sheet, carries the document through a document reading position X, and discharges the document to the discharged-sheet table 16.

Images of the document are read at the reading position X by an image reading unit 17 provided below the platen 13.

The image reading unit 17 includes a light source 18, various mirrors 19, and an image-data generating unit 20.

The light source 18 is a light source having a shape long in a so-called main scanning direction in which the platen 13 is irradiated from below.

The various mirrors 19 guide the light corresponding to document images that enter from the platen 13.

The image-data generating unit 20 accepts the light guided by the various mirrors 19, converts the light into an electric signal, and performs image processing or the like if necessary.

The main body 11 of the MFP includes an image forming unit 22, which is provided below the image reading unit 17 and prints image data. Image data which the image forming unit 22 can deal with are not limited to image data generated by the image-data generating unit 20. Recent MFPs 10 are configured to be able to execute print based on image data accepted from a user terminal device such as a personal computer (PC) included in a network configured by a LAN and the like.

The image forming unit 22 uses an electrophotographic method as a print method. The electrophotographic method is a method in which a photosensitive drum 24 is uniformly charged by a charger 25 and is irradiated by a laser 23 such that a latent image is formed on the photosensitive drum 24, toner is attached to the latent image by a developer (a rotary developer) 26 such that a visible image is formed, and the visible image is transferred onto a transfer medium by a transfer roller.

In the MFP corresponding to full color images, a developer 26 rotates, and a developer unit storing toner of a corresponding color is disposed at a position facing a photosensitive drum 24.

A latent image on the photosensitive drum 24 is developed by the toner stored in the developer 26, and is transferred onto an intermediate transfer belt 27.

In an image forming apparatus capable of forming color images, a developer 26 includes four developer units Y, C, M, and K storing toner of yellow (Y), cyan (C), magenta (M), and black (K), respectively. Transfer onto an intermediate transfer belt 27 is repeated for each color, whereby a full color image is formed on the intermediate transfer belt 27.

The full color image formed in the way described above is printed on a sheet-shaped transfer medium (an image formation medium) such as a paper sheet for print. Transfer medium are mounted in a sheet feeding cassettes 29*a*, 29*b*, and 29*c*.

When print is performed, the image forming unit 22 draws the transfer medium, sheet by sheet, from any one sheet feeding cassette by using a pickup roller 30, and sends the transfer medium to the intermediate transfer belt 27 by a conveyance roller 31 and the like. If a visible image on the intermediate transfer belt 27 is transferred onto a transfer medium, the image forming unit 22 sends the transfer medium to a fixing unit 28 (a fixing device) for fixing the visible image by a conveyance belt. Next, the image forming unit 22 performs heating and pressing on the transfer medium by the fixing unit 28, thereby fixing the visible image on the transfer medium. Transfer medium to be discharged from the image forming apparatus after the transfer and fixing of visible images are completed are hereinafter referred to as a printed material.

The printed material is discharged to the outside by the image forming unit 22 of the main body 11. On the left side of the main body 11 and a sheet feeding cassette unit of the MFP 10, a plurality of discharge trays are provided as printed-material discharge units.

In the MFP 10 of the present embodiment, the discharge trays include a standard tray 33 and five discharge trays 34*a*, 34*b*, 34*c*, 34*d*, and 34*e*.

The standard tray 33 is a discharge destination in a case where the user does not particularly designate a discharge destination for a printed material.

The discharge trays 34*a*, 34*b*, 34*c*, 34*d*, and 34*e* are discharge destinations in cases where discharge destinations for printed materials are designated. However, it is also possible to designate the standard tray 33 as a discharge destination.

Also, a sorting device 32 is disposed between a portion composed of the standard tray 33 and the discharge trays 34*a* to 34*e*, and a portion composed of the main body 11 and the sheet feeding cassette unit, and is connected to the two portions.

Although the operation mechanism of the sorting device 32 will not be described in detail, the sorting device 32 sorts individual printed materials generated according to print requests of a plurality of different users in the printed materials discharged from the image forming unit 22. The sorting device 32 sends the printed materials into the standard tray 33 or the discharge trays 34*a* to 34*e* designated by the users.

The main body 11 includes a control circuit unit 35. The control circuit unit 35 includes, for example, a central processing unit (CPU), various storage units, an interface for communication with a user terminal device (hereinafter, referred to as a terminal device) such as a personal computer (PC) connected to the present image forming apparatus by a network, and the like. The control circuit unit 35 stores various data, information, and control programs for operating the MFP 10 (the image forming apparatus). Also, the control circuit unit 35 performs drive control on all of the input/display unit 21, the image reading unit 17, the image forming unit 22, the sorting device 32, and the like. As illustrated in FIG. 1, the image-data generating unit 20 is also connected to the control circuit unit 35.

Figure 2:
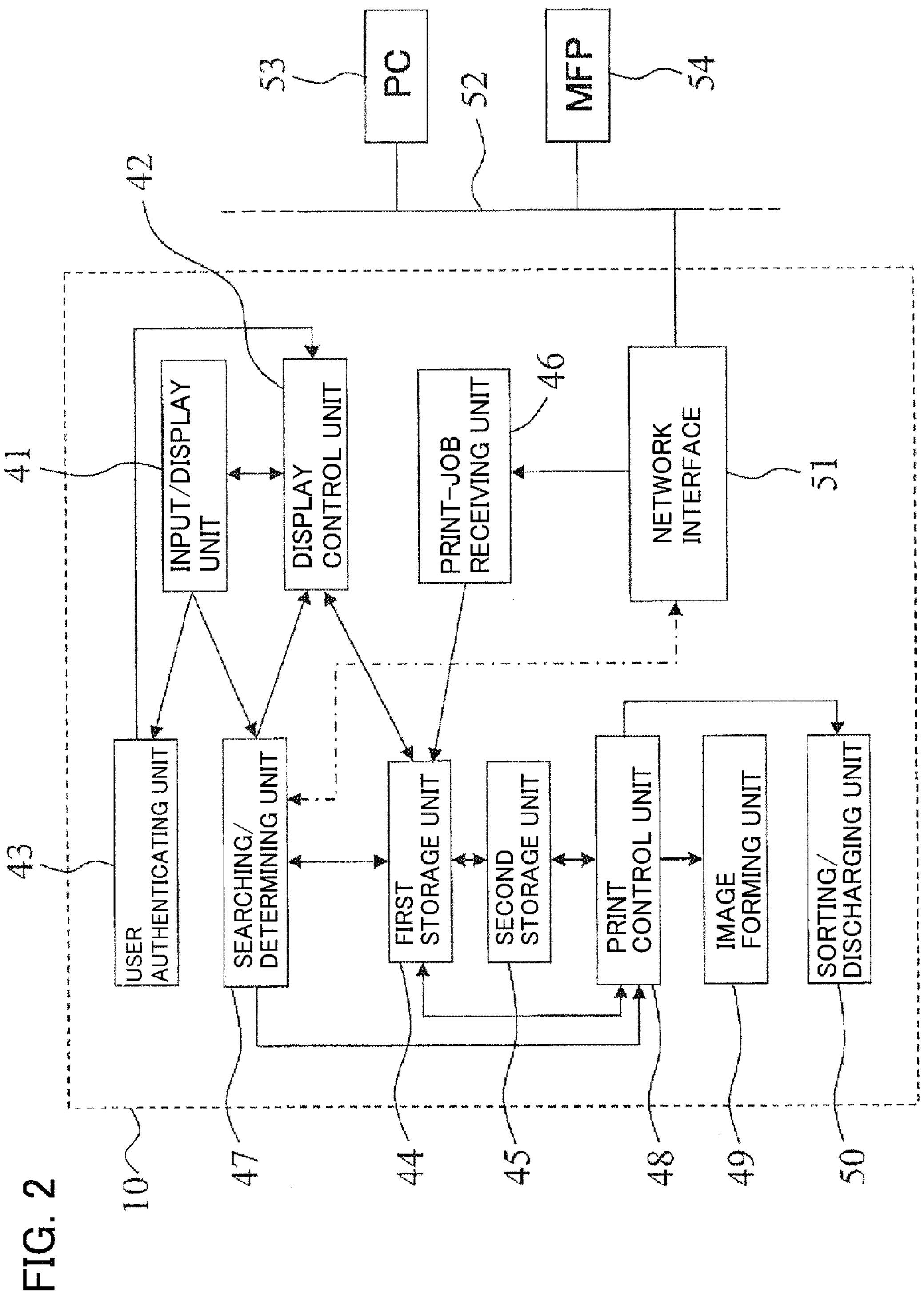
FIG. 2 is a view illustrating an example of a functional block configuration of the image forming apparatus according to the present disclosure which is connected to a network.

FIG. 2 is a diagram illustrating a functional block configuration of the image forming apparatus according to the present disclosure. This configuration corresponds to the MFP 10 illustrated in FIG. 1. Since the specific operation of each functional block will be described below in detail, here, each functional block will be outlined briefly.

An input/display unit 41 corresponds to the input/display unit 21 (FIG. 1) described already, and accepts input of setting conditions regarding print of print data, instructions regarding processes, a user authentication code regarding the private print, and the like, and displays the contents of the input setting conditions and instructions, information, and messages responding to the inputs and instructions.

With respect to each of the plurality of discharge units, the input/display unit 41 (a display unit) displays information on whether there is print job information designating each of the plurality of discharge units as a discharge destination of a printed material, based on a search result of a searching/determining unit 47 (a searching unit).

As a search result of the searching/determining unit 47 (the searching unit), in a case where a discharge unit undesignated as a discharge destination of a printed material exists in at least a portion of the plurality of discharge units, the input/display unit 41 (the display unit) highlights information representing the undesignated discharge unit of the plurality of discharge units.

The input/display unit 41 (a designating unit and a manipulation unit) is configured to be able to designate a specific discharge unit of the plurality of discharge units as a discharge destination of a printed material generated based on predetermined print job information.

Also, the input/display unit 41 (an input unit) is configured to be able to accept input of a user authentication code.

Based on the contents of setting conditions and instructions input from the input/display unit 41 and the like, a display control unit 42 generates corresponding display screen (window) data. Next, the display control unit 42 commands the input/display unit 41 to display a display screen on the input/display unit 41 (for example, on the touch panel).

For example, with respect to each of the plurality of discharge units, the display control unit 42 makes the input/display unit 41 (the display unit) display information on whether there is print job information designating each of the plurality of discharge units as a discharge destination of a printed material.

Also, for example, the display control unit 42 makes the input/display unit 41 (the display unit) highlight information representing an undesignated discharge unit of the plurality of discharge units.

On the basis of the user authentication code input from the input/display unit 41, a user authenticating unit 43 checks whether a person having input the code is a person having transmitted the print data regarding the private print to the MFP 10.

In a case where the authentication code accepted by the input/display unit 41 (the input unit) coincide with a user authentication code stored in association with predetermined print job information in a first storage unit 44 (a storage unit), the user authenticating unit 43 (an allowing unit) allows the image forming unit to execute a print job based on the predetermined print job information.

The first storage unit 44 (the storage unit) is composed of, for example, a random access memory (RAM). The first storage unit 44 temporarily stores not only print data from the user for executing a private print job, but also print data intermittently transmitted from a plurality of other users (terminal devices) through the network, print data directly input by the image reading unit 17, various information associated with those print data, and the like. The first storage unit 44 also particularly and temporarily stores information on a print-job execution state of the MFP 10, that is, information on whether each print job is being printed or is waiting in a print queue.

The first storage unit 44 (the storage unit) stores print job information, which includes print data, and designation information designating a specific discharge unit of the plurality of discharge units as designation information designating a discharge destination of a printed material to be generated on the basis of the corresponding print data.

A second storage unit 45 is a non-volatile storage device, and is configured to include a first portion composed of a high-capacity flash memory, EPROM, or ROM, and a second portion composed of an HDD.

The first portion of the second storage unit mainly stores various programs for controlling the entire MFP 10 such as a touch-panel image display program of the input/display unit 41, and a drive control program of the image forming unit (see FIG. 1). The second portion stores a plurality of image data items and print data acquired in the past by the MFP 10, a print-job-information acceptance history, a print-job execution history, and the like.

An image forming unit 49 almost corresponds to the internal configuration of the image forming unit 22 illustrated in FIG. 1.

The image forming unit 49 is configured to include a photosensitive drum 24, a charger 25, a laser 23, a developer 26, an intermediate transfer belt 27, and a fixing unit 28. Based on information on documents, figures, images, and the like included in print data, the image forming unit 49 performs printing (image forming) of the documents, the figures, the images, and the like onto transfer medium such as paper. The image forming unit 49 generates printed materials. Based on predetermined print job information, the image forming unit 49 forms images on transfer medium (image formation medium), thereby generating printed materials.

A sorting/discharging unit 50 almost corresponds to the sorting device 32, the standard tray 33, and the discharge trays 34*a* to 34*e* illustrated in FIG. 1. The sorting/discharging unit 50 sorts a plurality of printed materials printed by the image forming unit 49, and discharges each printed material to the standard tray 33 or any designated one of the discharge trays 34*a* to 34*e*.

The sorting device 32 corresponds to a sorting portion of the sorting/discharging unit 50.

The standard tray 33 and the discharge trays 34*a* to 34*e* correspond to discharge units. The MFP 10 includes a plurality of discharge units, and has six discharge units in the present embodiment. The plurality of discharge units are discharge destinations of printed materials generated by the image forming unit.

A print control unit 48 accepts instructions regarding print and printed-material discharge, performs drive control on the image forming unit 49 such that the image forming unit 49 generates printed materials based on print data, and performs drive control on the sorting/discharging unit 50 such that the sorting/discharging unit 50 sorts the printed materials and discharges the printed materials to each of the plurality of discharge units composed of the trays.

In a case where the input/display unit 41 (the designating unit) designates a specific discharge unit as the discharge destination of the printed material generated based on the predetermined print job information, the print control unit 48 (a setting unit) sets the designated discharge unit as the discharge destination of the printed material generated based on the predetermined print job information.

A searching/determining unit 47 is configured to be able to accept a request for executing a print job based on the predetermined print job information. In a case of accepting the request for executing the print job based on the predetermined print job information, with respect to each of the plurality of discharge units, the searching/determining unit 47 searches for print job information designating each of the plurality of discharge units as a discharge destination of a printed material, based on designation information included in the print job information stored in the first storage unit (the storage unit).

In a state where the MFP 10 has accepted a private print request, the searching/determining unit 47 searches for the print-job execution state of the MFP 10.

Next, based on the search result, the searching/determining unit 47 performs determination on whether to proceed directly to print execution, determination on a screen to be displayed on the input/display unit 41 for enabling the user to select the discharge destination (discharge unit) of the printed material regarding the private print, and the like.

The MFP 10 includes a network interface 51 for performing communication with an external terminal device constituting the network. The MFP 10 accepts print job information, which includes print data transmitted from the terminal device, through the network interface 51 by a print-job accepting unit 46. Next, the MFP 10 temporarily stores the print job information, accepted by the print-job accepting unit 46, in the first storage unit 44.

The MFP 10 is connected to a terminal device 53 such as PC, and another multi function peripheral (MFP) 54 through a line 52. The MFP 10, the device 53, and another MFP 54 connected through the line 52 constitute a network print system (image forming system) as a whole. In FIG. 2, one terminal device 53 and one MFP 54 are connected. However, a plurality of terminal devices 53 may be connected and a plurality of MFPs 54 may be connected.

Here, a "print job" defines, as processes or operations which the image forming apparatus performs after print data transmitted from the terminal device 53 or image data acquired from the image reading unit 17 (see FIG. 1) of the image forming apparatus are input to the image forming apparatus such as the MFP until a printed material generated based on these data is discharged to a discharge unit such as a tray. This is similarly applied even to the whole following description of the present disclosure.

Next, with respect to the MFP 10 having the configuration as illustrated in FIGS. 1 and 2, a private print operation and user's manipulation according to the present embodiment will be described. FIG. 3 is a flow chart illustrating a private-print executing method according to the present embodiment.

In the present embodiment, as illustrated in FIG. 2, the MFP 10 is connected to a PC 53 which is a user's terminal device, and a plurality of other PCs (not illustrated) by the line 52, such that a network is configured.

First, the user generates a print data file including documents, drawings, images, and the like, in the PC 53. Next, the user transmits print job information, which includes print data, information representing that the print data relates to the private print, a tray (tray name) designated as the discharge destination of a printed material, a user authentication code, and the like, from the PC 53 to the MFP 10 through the line 52, and makes a request for executing a private print job. Information on the PC name (terminal name) and information on the user name of the PC are also included in the above-mentioned print job information, which is automatically transmitted to the MFP 10.

The print job information and the request for executing the private print job transmitted from the user are accepted by the print-job accepting unit 46 through the network interface 51 of the MFP 10. Then, in STEP S1, the print-job accepting unit 46 temporarily stores all of the print job information, which includes the print data, the information representing that the print data relates to the private print, a tray designated as discharge destination of the printed material, and the user authentication code, in the first storage unit 44.

Next, in STEP S2, the user inputs the user authentication code from the input/display unit 41 of the MFP 10.

The user authenticating unit 43 checks the input user authentication code against the user authentication code stored in the first storage unit 44. If the two user authentication codes coincide with each other, the user authenticating unit 43 instructs the display control unit 42 to display a private-print-job allowance screen on the input/display unit 41.

Next, in STEP S3, the user inputs a request for executing a private print job to the input/display unit 41 while confirming the corresponding screen displayed on the input/display unit 41.

Subsequently, the searching/determining unit 47 accepts the request for executing the private print job input from the input/display unit 41. Next, in STEP S4, the searching/determining unit 47 accesses the first storage unit 44 and searches for print job information (print job information stored in the first storage unit 44) which the MFP 10 accepted already before the present private print job. The first storage unit 44 temporarily stores not only the corresponding private print job information but also information on a plurality of jobs transmitted from other PCs (not illustrated in FIG. 2) registered by other users, earlier than the corresponding private print job request, and including usual print jobs, not private print jobs.

FIG. 4 illustrates an example of print job information which is temporarily stored in the first storage unit 44 and which the searching/determining unit 47 searches for and extracts. In the example of FIG. 4, with respect to one print job, as information transmitted from the user, information on a document name, a user name, a terminal device name, a document file size, and a tray (discharge unit) designated as the discharge destination of a printed material by the user are stored. Also, in addition to these information, a acceptance time of the print-job accepting unit 46, and information on whether the corresponding print job of the MFP 10 is being executed (printed) or is waiting as information on a print job execution state are stored.

Here, an item 'DOCUMENT NAME' of FIG. 4 is information specifying the above-described print data.

An item 'DESIGNATED TRAY' is information specifying a discharge destination (discharge unit). Designated trays a, b, c, . . . , and e (the designated tray d is not illustrated) correspond to the discharge trays 34*a*, 34*b*, 34*c*, 34*d*, and 34*e* of the MFP 10 illustrated in FIG. 1, respectively. A designated tray X corresponds to the standard tray 33.

The searching/determining unit 47 searches the first storage unit for print jobs which are being printed and are waiting to be printed as described above.

Subsequently, in STEP S5, based on the search result in STEP S4, the searching/determining unit 47 determines whether there is any print job other than the corresponding private print job which is being printed or waiting to be printed in the MFP 10.

Subsequently, in a case of determining that there is a print job which is being printed or waiting to be printed in the MFP 10, in STEP S6, based on the search result in STEP S4, the searching/determining unit 47 determines whether there is any empty discharge unit (empty tray) undesignated as a discharge destination of a printed material in the MFP 10.

In a case where it is detected that the discharge tray c or the like exists as an empty tray as illustrated in the example of FIG. 4, the searching/determining unit 47 instructs the display control unit 42 to generate a discharge-destination-tray selection screen including the empty tray information of a printed material regarding the private print, as a discharge-destination-tray selection screen to be displayed for the user through the input/display unit 41.

In STEP S7, based on the print job information (see FIG. 4) searched for by the searching/determining unit 47, the display control unit 42 generates the discharge-destination-tray selection screen and displays the corresponding screen on the touch panel of the input/display unit 41.

FIG. 5 is a view illustrating an example of the discharge-destination-tray selection screen displayed on the above-described touch panel. As illustrated in FIG. 5, in the discharge-destination-tray selection screen, the print job information itself illustrated in FIG. 4 is not displayed. In the discharge-destination-tray selection screen, with respect to each discharge destination tray, only a designation state according to the print job information, a state of the print job (executing/waiting state), a file size of the print data to be printed (in a case where the corresponding discharge destination tray is designated from a plurality of print jobs, the sum of individual file sizes), and a print-job acceptance time are displayed.

Further, in the discharge-destination-tray selection screen, selection buttons for empty trays (the discharge trays c and d in FIG. 5) undesignated in any print jobs are highlighted by a change to a color different from the other selection buttons or a change in gray level. In this way, the discharge-destination-tray selection screen urges the user to select a selection button for an empty tray undesignated in any print jobs.

The user confirms the occupied state of each discharge tray (designated state of each discharge destination tray) by the other print jobs with reference to the discharge-destination-tray selection screen. In a case where a discharge tray (for example, the designation of the discharge tray e of FIG. 5) first designated during the private-print-job execution request has been designated by another users, the user presses, for example, the selection button for the empty discharge destination tray c for changing the discharge destination of the printed material, thereby selecting the discharge destination tray c, and then presses an OK button, thereby confirming the discharge destination. In a case of confirming that the first designated discharge tray has not been designated by any other users, in STEP S8, the user confirms the discharge destination, for example, only by pressing the OK button.

In this way, a print execution command of the print data of the user associated with the private print is accepted by the input/display unit 41. Then, the print execution command is transmitted to the print control unit 48 through the searching/determining unit 47 for instance.

The print control unit 48 takes the print data temporarily stored in the first storage unit 44, and performs drive control on the image forming unit 49 such that a printed material is generated based on the print data. Also, in STEP S10, the print control unit 48 sets the discharge unit designated by the user (which is a discharge unit to which any other printed materials have not been discharged, and is the discharge tray c in this case) as the discharge destination, and performs drive control on the sorting/discharging unit 50 such that the printed material is discharged. The user immediately obtains the discharged printed material. Therefore, the private print job is completed.

The print job flow described above describes a case where there is a print job of another user, which is being printed or waiting to be printed, as the search result of the searching/determining unit 47 in STEP S5. However, there is a case where there is no print job of another user, which is being printed or waiting to be printed, in the MFP 10 in STEP S5 as illustrated in FIG. 3. In this case, since all of the discharge trays 34*a* to 34*e* and the standard tray 33 of the MFP 10 have not been designated for discharge of print materials, the MFP 10 can discharge the printed material to an arbitrary discharge unit.

Therefore, the searching/determining unit 47 transmits the print execution command to the print control unit 48, without displaying the discharge-destination-tray selection screen on the input/display unit 41.

In STEP S10, the print control unit 48 performs drive control on the image forming unit 49 such that the printed material is generated based on the print data, and performs drive control on sorting/discharging unit 50 such that the printed material is discharged to the discharge destination tray first designated by the user.

According to the present embodiment, as described above, the image forming apparatus such as the MFP 10 includes a searching unit such as the searching/determining unit 47, a display/input unit, and a print control unit. The searching unit searches for any empty discharge unit (discharge destination tray) undesignated as a discharge destination of a printed material from print jobs of the other users. The display/input unit displays empty discharge units such that the empty discharge units are selectable as the discharge destination of the printed material according to the corresponding private print job when the empty discharge units are detected. The print control unit performs setting such that the printed material is discharged to a selected empty discharge unit.

Therefore, the MFP (image forming apparatus) is configured to separately discharge a printed material of a predetermined user to a designated empty discharge unit, such that it is possible to prevent the printed material of the predetermined user from being discharged to overlap a printed material of any other user. The MFP (image forming apparatus) is configured such that it is possible to particularly suppress confusion of a printed material regarding the private print with a printed material of any other user. The MFP (image forming apparatus) is configured such that it is possible to suppress the contents of the printed material of the predetermined user from being seen or obtained by other people.

Also, the MFP (image forming apparatus) is configured such that it is possible to change a discharge destination of a printed material regarding the private print, freely from first designation. The MFP (image forming apparatus) improves user's convenience.

Also, according to the present embodiment, as the search result of the searching/determining unit 47 (the searching unit), in a case where all of the discharge units of printed materials have not been designated as a discharge destination of a print job, and are empty, the image forming apparatus makes the image forming unit execute print without displaying a screen for urging selection of a discharge unit. Therefore, the MFP (image forming apparatus) suppresses occurrence of the user's trouble of reselecting or reconfirming the discharge destination, even though all of the discharge units are empty. As a result, the MFP (image forming apparatus) has also an advantage in which operability is not deteriorated.

In the print job flow illustrated in FIG. 3, as the search result of the searching/determining unit 47 in STEP S4 and the determination result in STEP S6, there may be no empty tray undesignated as a discharge destination of a printed material. Even in this case, the searching/determining unit 47 instructs the display control unit 42 to generate a selection screen to be displayed for the user, through the input/display unit 41. The selection screen is different from the selection screen in a case where there is the empty discharge destination tray of the printed material as illustrated in FIG. 5. In STEP S9, the display control unit 42 generates the selection screen based on the print job information searched for by the searching/determining unit 47, and displays the generated selection screen on the touch panel of the input/display unit 41.

FIG. 6 is a view illustrating an example of the screen displayed on the touch panel in STEP S9. Even in this display screen, with respect to each discharge destination tray, only a designation state according to the print job information, the state of the print job (a print executing state or a waiting state), a file size of the print data to be printed (in a case where the corresponding discharge destination tray is designated from a plurality of print jobs, the sum of file sizes), and a print-job acceptance time are displayed. As illustrated in FIG. 6, since there is no empty tray undesignated for print jobs, the input/display unit 41 displays a discharge-destination-tray selection screen similar to that in a case of a usual print job which is not a private print job.

The user can select two kinds of processes from this display screen.

First, in the case where there is no empty tray, the user can press (touch) a button 'PRINT STOP' displayed on the screen. In this case, for example, the input/display unit 41 transmits a print stop determination signal to the searching/determining unit 47. Then, the searching/determining unit 47 accepts the print stop determination signal, and erases the information regarding to the corresponding private print job including the print data temporarily stored in the first storage unit 44. Therefore, the process of the MFP 10 returns to the state before STEP S1.

Next, in a case where there is no empty tray, if the user daringly desires to execute the private print job, in STEP S8, the user can press a selection button for any one tray of the trays a to X displayed on the screen (see FIG. 6), thereby selecting the discharge destination tray, or confirm the first designated discharge destination tray, and then press a button 'CONTINUATION OF PRINT', thereby confirming print.

Then, the input/display unit 41 transmits the print execution command of the print data of the user associated with the private print to the print control unit 48 through the searching/determining unit 47 for instance.

Therefore, in STEP S10, the MFP (image forming apparatus) executes print through the same procedure as that in the above-described case where there is an empty tray, and discharges the printed material to the discharge unit (discharge destination tray) designated by the user. Although there may be a printed material of another user already discharged to the discharge destination tray, the user can immediately take the printed material regarding the private print by taking care not to confuse the printed material regarding the private print with the printed material of another user.

(Second Embodiment)

FIGS. 7 and 8 are flow charts for illustrating a private-print executing method according to a second embodiment of the present disclosure. An image forming apparatus used in private print according to the second embodiment is also a MFP 10 having the internal configuration illustrated in FIG. 1 and the functional block configuration illustrated in FIG. 2.

As illustrated in FIG. 2, the MFP 10 (the image forming apparatus and a first image forming apparatus) is connected even to the multi function peripheral (MFP) 54 (another image forming apparatus and a second image forming apparatus) through the line 52 of the network.

The second MFP 54 is particularly configured by the same functional blocks as those of the MFP 10 (a first MFP) illustrated in FIG. 2.

In the present embodiment, the MFP 10, the MFP 54, and the PC 53 of the user constitute an image forming system.

Hereinafter, a private print job operation and user's manipulation in the image forming system of the present embodiment will be described with reference to FIGS. 1, 2, 7, and 8.

Since the MFP 10 and the MFP 54 basically have the same functions as those of the first embodiment, process steps of performing the same operations as those of the process steps (STEPS S1 to S10) described in the first embodiment will be described briefly or will not be described.

First, the user transmits print job information and an execution request from the PC 53 to the MFP 10 through the line 52. The print job information includes print data including documents, drawings, images, and the like, information representing that the print data relates to the private print, a tray (tray name) of the MFP 10 designated as the discharge destination of a printed material, and a user authentication code.

Information on the PC name (terminal name) and information on the user name of the PC are also included in the above-mentioned print job information, which is automatically transmitted.

Subsequently, in STEP S21, the print-job accepting unit 46 accepts a private print job request transmitted from the user, and temporarily stores all of the print job information including the print data, the information representing that the print data relates to the private print, the user authentication code, and the like in the first storage unit 44.

Next, in STEP S22, the user inputs the user authentication code from the input/display unit 41 of the MFP 10.

Then, in STEP S23, the user inputs a request for executing a private print job from the screen displayed on the input/display unit 41.

Subsequently, on the basis of the request for executing the private print job input from the input/display unit 41, the searching/determining unit 47 accesses the first storage unit 44, and searches for print job information already accepted by the MFP 10 before the present private print job.

At the same time, in STEP S24, the searching/determining unit 47 also accesses the first storage unit of the MFP 54 (another image forming apparatus) through the network interface 51 and the line 52, and searches for information regarding print jobs already accepted by the MFP 54.

Next, the searching/determining unit 47 takes the print job information (search result information) of the MFP 54 as a search result into the MFP 10 through the line 52 and the network interface 51, and temporarily stores the print job information in the first storage unit 44.

Even in the present embodiment, although not illustrated in FIG. 2, except for the corresponding private print job information, the print job information of the MFP 10 and the MFP 54 searched for by the searching/determining unit 47 relates, not to private print jobs, but to usual print jobs transmitted from other PCs registered by other users, earlier than a corresponding private print job request.

The print job information which the searching/determining unit 47 searches for and temporarily stores in the first storage unit 44 is basically the almost same kind of information as the print job information of the first embodiment as illustrated in FIG. 4. For example, with respect to one print job, the print job information includes a document name which is a print job execution subject, a user name, a terminal device name, a document file size, a tray (discharge unit) designated as a discharge destination of a printed material by the user, the acceptance time of a print job, and a print job execution state (the print job executing state (printing state) or the waiting state). In the present embodiment, since the first storage unit 44 includes the print job information regarding the MFP 54, an MFP name is added as an item of a table.

Subsequently, in STEP S25, on the basis of the search result in STEP S24, the searching/determining unit 47 determines whether there is any print job which is being printed or waiting to be printed in the MFP 10.

In a case of determining that there is a print job other than the corresponding private print job which is being printed or waiting to be printed in the MFP 10, in STEP S26, on the basis of the search result in STEP S24, the searching/determining unit 47 determines whether there is any empty discharge unit (empty tray) undesignated as a discharge destination of a printed material in the MFP 10 and the MFP 54.

In a case of detecting that an empty tray exists somewhere in the MFP 10 or 54, the searching/determining unit 47 instructs the display control unit 42 to generate a screen for selecting the discharge destination tray of the printed material regarding the private print, as a print-destination-tray selection screen to be displayed for the user through the input/display unit 41.

In STEP S27, the display control unit 42 generates the discharge-destination-tray selection screen on the basis of the print job information searched for by the searching/determining unit 47, and displays the generated selection screen on the touch panel of the input/display unit 41.

The discharge destination selection screen displayed in STEP S27 can be the same as that of the example of FIG. 5 in the first embodiment. On the discharge destination selection screen, with respect to each discharge destination tray, the designation state by print jobs of other users, the state of the print job (the executing state or the waiting state), the sum of file sizes of print data to be printed, and the print-job acceptance time are displayed. Further, on the discharge-destination-tray selection screen, buttons for empty trays are highlighted. Therefore, the discharge-destination-tray selection screen urges the user who desires to execute the private print to select a selection button for an empty tray undesignated for print jobs. However, in the present embodiment, on the discharge-destination-tray selection screen, a selection screen including selection buttons for the discharge designation trays of the MFP 10 and the discharge destination trays of the MFP 54 are displayed.

In a case of changing the first designated discharge destination tray, the user presses a selection button of an MFP (a name or identification information) and a selection button for a discharge destination tray (particularly, an empty tray), thereby selecting the discharge destination of the printed material, and presses the OK button, thereby confirming the discharge destination.

In a case where the first designated discharge destination tray is an empty tray, in STEP S28, on the selection screen, the user confirms the discharge destination and presses the OK button.

In a case where the user selects a tray of the MFP 10 as the discharge destination, the print job is executed in the same flow as that of the first embodiment. In STEP S30, the printed material regarding the private print is generated in the same way as that in the first embodiment, and is discharged to the discharge unit (empty tray) of the MFP 10 designated by the user.

Here, in a case where there is no empty tray in the MFP 10 and there is an empty tray in the MFP 54, the user may change the discharge destination from the tray of the MFP 10 to the empty tray of the MFP 54 through the input/display unit 41 on which the selection screen has been displayed. The user selects the empty tray of the MFP 54 as the discharge destination through the input/display unit 41, and confirms the selection, for example, by pressing the OK button.

Therefore, the print execution command of the print data of the user associated with the private print is accepted by the input/display unit 41.

The print execution command is transmitted to, for example, the searching/determining unit 47.

Then, in STEP S31 of FIG. 8, the searching/determining unit 47 transmits the private print job information, including the print data temporarily stored in the first storage unit 44, to the MFP 54 through the network interface 51. In this way, the request for executing the private print job is moved from the MFP 10 to the MFP 54.

If accepting the request for executing the private print job, the MFP 54 performs the same subsequent operation or process as that of the MFP 10. In other words, in STEP S32, the MFP 54 accepts the private print job request transmitted from the MFP 10.

Next, in STEP S33, the user inputs the user authentication code from the input/display unit of the MFP 54. The MFP 54 allows the private print job on the basis of the input user authentication code.

Next, in STEP S34, the user inputs the request for executing the private print job from the input/display unit.

Subsequently, in STEP S35, on the basis of the request for executing the private print job, the searching/determining unit of the MFP 54 accesses the first storage unit of the MFP 54 and the like, and searches for accepted print job information regarding other users.

Next, in STEP S36, on the basis of the search result in STEP S35, the searching/determining unit determines whether there is information on any print job other than the corresponding private print job which is being printed or waiting to be printed. In a case of determining that there is print job information which is being printed or waiting to be printed, in STEP S37, on the basis of the search result in STEP S35, the searching/determining unit determines whether there is any empty tray undesignated as a discharge destination of a printed material except for the corresponding private print job.

In the present embodiment, since the MFP 10 has detected the empty tray of the MFP 54, in STEP S38, the discharge-destination-tray selection screen is displayed on the touch panel of the input/display unit. In STEP S40, the user presses a selection button of a tray, corresponding to the discharge destination tray selected on the input/display unit 41 of the MFP 10 in the input/display unit of the MFP 54 in STEP S28, and presses the OK button, thereby confirming the discharge destination.

Therefore, in STEP S41, the printed material regarding the private print is generated in the same way as that in the first embodiment, and is discharged to the designated discharge unit (empty tray) of the MFP 54.

As the search result in STEP S36 of the print job flow illustrated in FIG. 8, in a case where the searching/determining unit of the MFP 54 determines that there is no print job which is being printed or waiting to be printed and all discharge destination trays have not been designated except for designation according to the corresponding private print job, after STEP S36, similarly to the first embodiment, processing of STEP S41 is immediately performed. In other words, the printed material is generated without displaying the discharge-destination-tray selection screen on the input/display unit of the MFP 54, and is discharged to the discharge destination tray designated in the MFP 10.

As described above, the MFP 10 (the image forming apparatus) is connected to the MFP 54 (another image forming apparatus) having one or more discharge units and a storage unit for storing print job information, through a communication line, such that print job information can be transmitted and accepted.

The searching/determining unit 47 (the searching unit) of the MFP 10 is configured to be able to accept a request for executing a print job based on predetermined print job information. In a case of accepting a request for executing a predetermined print job, on the basis of designation information included in the print job information stored in the first storage unit 44 (the storage unit) of the MFP 10, and designation information included in the print job information stored in the storage unit of the MFP 54, with respect to each of the plurality of discharge units of the MFP 10 and the one or more discharge units of the MFP 54, the searching/determining unit 47 of the MFP 10 searches for print job information designating each of the plurality of discharge units of the MFP 10 and the one or more discharge units of the MFP 54 as a discharge destination of a printed material.

On the basis of the search result of the searching/determining unit 47 (the searching unit), with respect to each of the plurality of discharge units of the MFP 10 and each of the one or more discharge units of the MFP 54, the input/display unit 41 (the display unit) of the MFP 10 displays information on whether there is print job information designating each of the plurality of discharge units of the MFP 10 and each of the one or more discharge units of the MFP 54 as a discharge destination of a printed material.

The input/display unit 41 (the designating unit) of the MFP 10 can designate a specific discharge unit of the plurality of discharge units of the MFP 10 and the one or more discharge units of the MFP 54 as the discharge destination of the printed material generated on the basis of the predetermined print job information.

In a case where the input/display unit 41 (the designating unit) designates a specific discharge unit, for example, a discharge unit of the MFP 54 as the discharge destination of the printed material generated on the basis of the predetermined print job information, the print control unit 48 (the setting unit) sets the designated discharge unit of the MFP 54 as the discharge destination of the printed material generated on the basis of the predetermined print job.

In a case where the print control unit 48 (the setting unit) sets a specific discharge unit, for example, a discharge unit of the MFP 54 as the discharge destination of the printed material generated on the basis of the predetermined print job information, the searching/determining unit 47 (the searching unit) outputs the predetermined print job information from the first storage unit 44 (the storage unit) to the MFP 54.

Also, in the case where the print control unit 48 (the setting unit) sets a specific discharge unit, for example, a discharge unit of the MFP 54 as the discharge destination of the printed material generated on the basis of the predetermined print job information, the searching/determining unit 47 (the searching unit) outputs the request for executing the print job based on the predetermined print job information to the MFP 54.

As can be seen from the above-mentioned description, the present embodiment has the same effects as those of the first embodiment.

Further, according to the present embodiment, it is possible to select an empty discharge destination tray undesignated for discharge of other printed materials from a plurality of MFPs constituting an image forming system by a network. Therefore, the MFP 10 (and the image forming system) increases the probability of selecting an empty discharge destination tray. Accordingly, the MFP 10 (and the image forming system) further suppresses mixture of a printed material regarding the private print and other printed materials. As a result, the user can obtain the printed material without making the printed material be seen or taken by other people.

The MFP 54 has a function of proceeding to STEP S39 corresponding to STEP S9 of the first embodiment in a case where there is no empty tray undesignated as a discharge destination of a printed material in STEP S37. However, in the present embodiment, since it has been assumed that there is an empty discharge destination tray in the MFP 54, STEP S39 will not be described.

Also, as illustrated in FIG. 7, even in STEP S26 of the process of the MFP 10, there is a case where there is no empty tray undesignated as a discharge destination of a printed material. This means that there is no empty tray undesignated as a discharge destination of a printed material not only in the MFP 10 but also in the MFP 54 as the search result of the searching/determining unit 47. In this case, similarly to the first embodiment, the process of the searching/determining unit 47 proceeds from STEP S26 to STEP S29 corresponding to STEP S9. In STEP S29, a selection screen for enabling selection of the discharge destination tray of the printed material and selection of continuation or stop of a print process as illustrated in FIG. 6 is displayed.

In a case where the print continues, since the user will naturally select a discharge tray of the MFP 10 rather than the MFP 54 as the discharge destination of the printed material in STEP S28, after this selection, STEP S30 is executed and the private print job finishes. In a case of stopping the print, the same procedure as that of the first embodiment is performed.

A part of the operation of the MFP and the user's manipulation in a private print job according to the first and second embodiments is changeable. Some users may consider that even a printed material regarding the private print may be discharged to a discharge tray together with printed materials of other users as in the related art. In response to this, as the next process step of the private print execution request (STEP S3 of FIG. 3 or STEP S23 of FIG. 7), a process step of inquiring the user about whether to display a screen for selecting the discharge destination tray of the printed material as illustrated in FIGS. 5 and 6 in advance may be provided.

If this step is provided, the image forming apparatus (the MFP 10) operates as follows.

If the input/display unit 41 accepts the input of a request for executing a private print job, the display control unit 42 makes the input/display unit 41 display the screen for inquiring about whether the screen for selecting the discharge destination tray of the printed material is necessary. If the user chooses not to perform display through the input/display unit 41, for example, this selection information (instruction) is transmitted to the searching/determining unit 47 through the display control unit 42. Then, the searching/determining unit 47 immediately provides a print execution instruction to the print control unit 48. In contrast, if the user chooses to perform display, the searching/determining unit 47 executes the process of STEP S4 of FIG. 3 or STEP S24 of FIG. 7.

Also, even if an empty discharge tray is designated as the discharge destination of the printed material regarding the private print, without a time interval, another user may designate the same discharge tray as a discharge destination. In this case, after the printed material regarding the private print is discharged and another printed material may successively discharged such that the printed materials are mixed in the designated discharge tray.

In response to this, in STEP S10 (see FIG. 3), STEP S30 (see FIG. 7), or STEP S41 (see FIG. 8), after the printed material regarding the private print is discharged, a printed material of another user may be discharged with a time interval of 30 seconds to 3 minutes for instance. To this end, for example, on the basis of information representing that the print job transmitted from the searching/determining unit 47 is a private print job, the print control unit 48 can control the image forming unit 49 and the like.

Also, in general, in the MFP 10 or the like, after the printed material is discharged, the print data of the documents, the drawings, the images, and the like regarding the print job temporarily stored in the first storage unit 44 is moved to the high-capacity second storage unit 45 by the print control unit 48, for example, and is stored therein for a long time. However, since the print data regarding the private print is highly confidential data, in this case, for example, the print control unit 48 may be configured to erase the temporarily stored print data from the first storage unit 44 after the printed material is discharged.

Also, the present disclosure discloses an image forming method in which an image forming apparatus having a plurality of discharge units as discharge destinations of generated printed materials forms images on image formation medium so as to generate a printed material, and discharges the printed material to a predetermined discharge unit.

The image forming method includes an image forming step of allowing the image forming apparatus to form images on image formation medium on the basis of predetermined print job information, thereby generating a printed material, a storing step of allowing the image forming apparatus to store print job information including print data and designation information designating a specific discharge unit out of the plurality of discharge units as designation information designating a discharge destination of a printed material generated on the basis of the print data, a searching step of allowing the image forming apparatus to search for print job information designating each of the plurality of discharge units as a discharge destination of a printed material with respect to each of the discharge units on the basis of the designation information included in the stored print job information in a case of accepting a request for executing a print job based on the predetermined print job information, a displaying step of displaying information on whether there is print job information designating each of the plurality of discharge units as a discharge destination of a printed material with respect to each of the plurality of discharge units on the basis of a search result in the searching step, a designating step capable of designating a specific discharge unit out of the plurality of discharge units as the discharge destination of the printed material generated on the basis of the predetermined print job information, and a setting step of setting the specific discharge unit as the discharge destination of the printed material generated on the basis of the predetermined print job information in a case where the specific discharge unit is designated as the discharge destination of the printed material generated on the basis of the predetermined print job information in the designating step.

Also, a program for executing the above-mentioned image forming method may be provided. Further, a recording medium which stores the program such that the program can be executed in the image forming apparatus may be provided.

The invention claimed is:

1. An image forming apparatus comprising:

an image forming unit that forms images on image formation medium on the basis of predetermined print job information, thereby generating a printed material;

a plurality of discharge units that are discharge destinations of printed materials generated by the image forming unit;

a storage unit that stores print job information including print data and designation information designating a specific discharge unit out of the plurality of discharge units for the printed material generated on the basis of the print data;

a searching unit that is configured to be able to accept a request for executing a print job based on the print job information, and search for the print job information designating the plurality of discharge units as the discharge destinations of the printed materials on the basis of the designation information, when the searching unit accepts the request for executing the print job;

a display unit that displays information on an occupied state of each unit of the plurality of discharge units as a discharge destination of a printed material generated according to the print job information; and a designating unit capable of designating a specific discharge unit out of the plurality of discharge units as the discharge destination of the printed material generated according to the print job information; and a setting unit that sets the specific discharge unit as the discharge destination of the printed material in a case where the designating unit designates the specific discharge unit as the discharge destination of the printed material, wherein the designating unit allows a user to designate a discharge unit, to which a printed material of the user to be discharged, according to the information on the occupied state displayed on the display unit, wherein the image forming unit starts to execute a waiting print job of the user subsequent to the setting unit setting the discharge unit designated by the designating unit at the discharge destination, and wherein the image forming unit starts to execute a waiting print job of the user subsequent to the setting unit setting the discharge unit designated by the designating unit as the discharge destination, and wherein the image forming apparatus is configured to discharge the printed material to the specific discharge unit designated by the designation information without causing the display unit to display the information on the occupied state when no print jobs requested by other users exit.

2. The image forming apparatus according to claim 1, wherein in a case where a discharge unit undesignated as a discharge destination of a printed material exists in at least a portion of the plurality of discharge units as a search result of the searching unit, the display unit highlights information indicating the undesignated discharge unit out of the plurality of discharge units.

3. The image forming apparatus according to claim 1, further comprising:

an input unit capable of accepting an input of a user authentication code; and an allowing unit that allows the image forming unit to execute the print job based on the print job information in a case where the user authentication code accepted by the input unit coincides with a user authentication code stored in association with the print job information in the storage unit.

4. The image forming apparatus according to claim 3, wherein the print job is a private print job.

5. The image forming apparatus according to claim 1, wherein in a case where the image forming apparatus is connected to another image forming apparatus through a communication line such that print job information can be transmitted and accepted, and the another image forming apparatus includes one or more discharge units and a storage unit for storing the print job information, the searching unit is configured to search for the print job information designating the one or more discharge units of another image forming apparatus as a discharge destination of a printed material, on the basis of designation information included in the print job information stored in the storage unit of the image forming apparatus, the display unit displays information on an occupied state of each of the one or more discharge units of the another image forming apparatus on the basis of a search result of the searching unit, the designating unit is capable of designating a specific discharge unit of the one or more discharge units of the another image forming apparatus as the discharge destination of the printed material, and in a case where the specific discharge unit designates the specific discharge unit another image forming apparatus as the discharge destination of the printed material, the setting unit sets the designated specific discharge unit of the another image forming apparatus as the discharge destination of the printed material.

6. The image forming apparatus according to claim 5, wherein in a case where the setting unit sets the specific discharge unit of the another image forming apparatus as the discharge destination of the printed material, the searching unit outputs the print, job information from the storage unit to the another image forming apparatus.

7. The image forming apparatus according to claim 6, wherein the searching unit outputs the request for executing the print job to the another image forming apparatus.

8. An image forming method in which an image forming apparatus having a plurality of discharge units as discharge destinations of generated printed materials forms images on image formation medium so as to generate a printed material, and discharges the printed material to a predetermined discharge unit, comprising:

an image forming step of allowing the image forming apparatus to form images on the image formation medium on the basis of print job information, thereby generating a printed material;

a storing step of allowing the image forming apparatus to store print job information including print data and designation information designating a specific discharge unit out of the plurality of discharge units as designation of the printed material generated on the basis of the print data;

a searching step of allowing the image forming apparatus to search for print job information designating each of the plurality of discharge units as a discharge destination of the printed material with on the basis of the designation information in a case of accepting a request of executing a print job based on the print job information;

a displaying step of allowing the image forming apparatus to display information on an occupied state of the plurality of discharge on the basis of a search result in the searching step;

a designating step of allowing the image forming apparatus to designate a specific discharge unit out of the plurality of discharge units as the discharge destination of the printed material; and a setting step of allowing the image forming apparatus to set the specific discharge unit as the discharge destination of the printed material in a case where the specific discharge unit is designated as the discharge destination of the printed material in the designating step, wherein the designating step allows a user to designate a discharge unit, to which a printed material of the user is to be discharged, according to the information of the occupied state displayed on the display step, wherein the image forming unit starts to execute a waiting print job of the user subsequent to setting of the discharge unit designated in the designating step as the discharge destination being performed in the setting step, and wherein the image forming apparatus is configured to discharge the printed material to the specific discharge unit designated by the designation information without causing the information on the occupied state to be displayed in the displaying step when no print jobs requested by other users exist.

9. A storage medium that stores a computer program for executing the image forming method according to claim 8, wherein the storage medium is computer-readable.

* * * * *